US008386398B1

(12) United States Patent
Hickman (10) Patent No.: US 8,386,398 B1
(45) Date of Patent: Feb. 26, 2013

(54) CAMPAIGN GOAL PRICING

(75) Inventor: Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1051 days.

(21) Appl. No.: 12/124,453

(22) Filed: May 21, 2008

(51) Int. Cl.
G06Q 30/00 (2012.01)
G06F 17/00 (2006.01)

(52) U.S. Cl. ............... 705/400; 705/14.41; 705/14.44

(58) Field of Classification Search ............ 705/7.35, 705/14.41, 14.43–45, 14.69–71, 400
See application file for complete search history.

(56) References Cited

U.S. PATENT DOCUMENTS

| | | | |
|---|---|---|---|
| 2003/0195807 A1* | 10/2003 | Maggio et al. | 705/14 |
| 2004/0133434 A1* | 7/2004 | Szlam et al. | 705/1 |
| 2005/0027587 A1* | 2/2005 | Latona et al. | 705/10 |
| 2005/0028188 A1* | 2/2005 | Latona et al. | 725/13 |
| 2005/0149396 A1* | 7/2005 | Horowitz et al. | 705/14 |
| 2005/0189414 A1* | 9/2005 | Fano et al. | 705/14 |
| 2005/0256778 A1* | 11/2005 | Boyd et al. | 705/26 |
| 2006/0224445 A1* | 10/2006 | Axe et al. | 705/14 |
| 2007/0022032 A1* | 1/2007 | Anderson et al. | 705/35 |
| 2007/0106555 A1* | 5/2007 | Benson | 705/14 |
| 2007/0192166 A1* | 8/2007 | Van Luchene | 705/10 |
| 2007/0233503 A1 | 10/2007 | Meyer et al. | |
| 2007/0239560 A1* | 10/2007 | McGuire et al. | 705/26 |
| 2008/0004955 A1* | 1/2008 | Mathew et al. | 705/14 |
| 2008/0059208 A1* | 3/2008 | Rockfeller et al. | 705/1 |
| 2008/0133347 A1* | 6/2008 | Josifovski et al. | 705/14 |
| 2008/0140508 A1* | 6/2008 | Anand et al. | 705/10 |
| 2008/0201186 A1* | 8/2008 | Poon et al. | 705/7 |
| 2008/0249991 A1* | 10/2008 | Valz | 707/3 |
| 2009/0144129 A1* | 6/2009 | Grouf et al. | 705/10 |
| 2009/0144130 A1* | 6/2009 | Grouf et al. | 705/10 |
| 2009/0150215 A1* | 6/2009 | Kalb et al. | 705/10 |
| 2009/0150224 A1* | 6/2009 | Lu et al. | 705/400 |
| 2009/0222346 A1* | 9/2009 | Greene et al. | 705/14 |
| 2009/0228338 A1* | 9/2009 | Brandman et al. | 705/10 |
| 2010/0235219 A1* | 9/2010 | Merrick et al. | 705/10 |

OTHER PUBLICATIONS

Klau, et al., Advertising on the Internet: How to Build Online Awareness for Your Law Practice, Law Prac., vol. 33, Mar. 2007, pp. 48-52.*
Bhattacharya, A Chance Constraints Goal Programming Model for the Advertising Planning Problem, Eur. J. of Operational Res., vol. 192, 2009, pp. 382-395.*
Ratnatunga, et al., The Brand Capability Value of Integrated Marketing Communication (IMC), J. Advertising, vol. 34, No. 4, 2005, pp. 25-40.*
Kwak, et al., An MCDM Model for Media Selection in the Dual Consumer/Industrial Market, Eur. J. of Operational Res., vol. 166, 2005, pp. 255-265.*

* cited by examiner

Primary Examiner — Daniel Vetter
(74) Attorney, Agent, or Firm — Fish & Richardson P.C.

(57) ABSTRACT

Advertising pricing based on campaign goal progress and/or achievement. Surveys conducted during campaign initiation can determine baseline statistics for goals. Periodic surveys during and after the campaign can be used to measure progress toward a goal and/or whether the goal has been achieved. Pricing of the campaign can be tied to goal progress and/or achievement. In one implementation, lift in brand awareness among an audience can be a campaign goal that is measured. Survey results are integrated into an ad server for running display ads on a publisher website and the advertiser only pays for percentage point lifts in reader awareness.

19 Claims, 7 Drawing Sheets

CAMPAIGN GOAL PRICING

BACKGROUND

This document relates to information management.

The Internet enables access to a wide variety of content items, e.g., video and/or audio files, web pages for particular subjects, and news articles. Such access to these content items has likewise enabled opportunities for targeted advertising. For example, content items of particular interest to a user can be identified by a search engine in response to a user query. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

Often an advertiser designs an advertising campaign that includes multiple advertisements that share an idea or theme for a product or service. Such a campaign may be designed with one or more goals, and these goals can be either quantitative or qualitative. An example quantitative goal can be increasing sales of the product or service. A qualitative campaign goal, however, can be a goal that is not directly tied to a quantifiable return on investment. Example qualitative campaign goals can be increasing brand awareness for a target demographic and increasing brand likeability.

Running such campaigns incurs a cost, and that cost is typically budgeted for the life of the campaign. In some online advertising systems, for example, advertisers pay for their advertisements in a campaign on a per-action basis, e.g., a cost-per-click (CPC) basis. The CPC of an identified advertisement can be multiplied by a performance metric, e.g., a click-through rate (CTR), for the advertisement in an auction process. This multiplied value is thus proportional to the cost of advertisement presentation. Generally, the better the advertisement performs, the better the expected return on investment (ROI) for the advertiser.

While the per-action cost model works well for a campaign that has quantitative goals and/or has quantitative budget parameters, e.g., $10,000/day of advertising spending, this same cost model may not accurately model the cost for achieving a qualitative goal. For example, a campaign may be designed to increase brand awareness. The campaign may include advertisement that are not intended to elicit clicks, but are instead intended to imprint the brand or product in the minds of the viewers. In such a campaign, the viewers' interaction with the advertisement, e.g., a click through, may not correlate to an incremental achievement of the qualitative goal. It may therefore be difficult to measure whether the qualitative goal of a campaign is being achieved in proportion to the cost incurred by a per-action cost model.

SUMMARY

In general, the subject matter of this application relates to advertising pricing based on campaign goal progress and/or achievement of qualitative goals. One aspect of the subject matter described in this specification can be embodied in a method that includes the actions of identifying a campaign metric for an advertising campaign, the campaign metric for measuring a qualitative campaign goal; measuring an initial campaign metric value of the advertising campaign; measuring a subsequent campaign metric value for the advertising campaign; and determining a campaign cost (e.g., based on the initial campaign metric value and the subsequent campaign metric value). Other embodiments of this aspect include corresponding methods, apparatus, and computer program products.

Another aspect of the subject matter described in this specification can be embodied in a method that includes the actions of identifying a campaign metric for an advertising campaign, the campaign metric for measuring a qualitative campaign goal; measuring an initial campaign metric value of the advertising campaign; measuring a subsequent campaign metric value for the advertising campaign; and determining a campaign cost based on the initial campaign metric value and the subsequent campaign metric value. Other embodiments of this aspect include corresponding methods, apparatus, and computer program products.

Another aspect of the subject matter described in this specification can be embodied in a method that includes the actions of identifying a qualitative campaign metric for an advertising campaign, the qualitative campaign metric for measuring a qualitative metric of the advertising campaign; measuring the qualitative campaign metric of the advertising campaign to obtain a qualitative value; and determining a campaign cost based on the qualitative value. Other embodiments of this aspect include corresponding methods, apparatus, and computer program products.

Various optional advantages and features can include campaign spending in proportion to campaign goal achievement for qualitative goals. Campaign spending can be further proportioned according to incremental achievement of a goal, e.g., a first portion of a budget for a first percentage of brand awareness lift, and a second portion of the budget for a second percentage of brand awareness lift in excess of the first percentage. Campaign progress toward a qualitative campaign goal can be monitored and the campaign can be suspended if the campaign progress does not exceed a minimum progress threshold during a monitored time period so that advertiser resources, e.g., remaining budget, is not allocated to poorly performing campaigns. These various optional advantages and features can be separately realized and need not present in any particular embodiment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

In general, the subject matter of this specification relates to advertising pricing based on campaign goal progress and/or achievement. Surveys conducted during campaign initiation can determine baseline statistics for qualitative goals. Periodic surveys during and after the campaign can be used to measure progress toward a goal and/or whether the goal has been achieved. Pricing of the campaign can be tied to goal progress and/or achievement. In one implementation, lift in brand awareness among an audience can be a campaign goal that is measured. In some implementations, survey results that can be used to determine brand awareness lift are integrated into an advertisement server that serves advertisements to a publisher website, and the advertiser only pays for percentage point lifts in brand awareness.

§1.1 Advertising Environment

Figure 1:
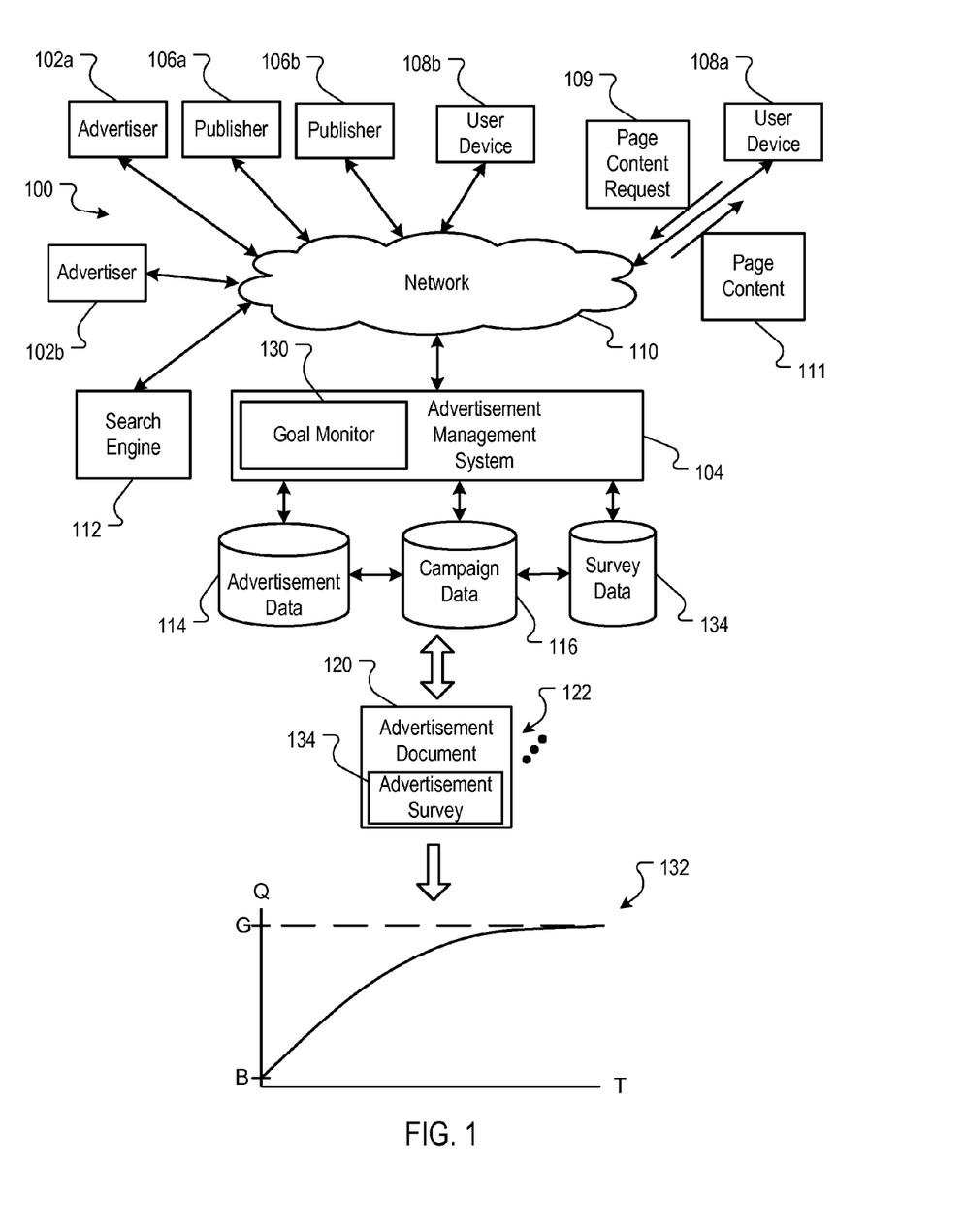
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102*a* and 102*b*, an advertisement management system 104, publishers 106*a* and 106*b*, user devices 108*a* and 108*b*, and a search engine 112. Although only two advertisers (102*a* and 102*b*), two publishers (106*a* and 106*b*) and two user devices (108*a* and 108*b*) are shown, the online environment 100 may include many thousands of advertisers, publishers and user devices.

§1.2 Advertisement Publishing and Tracking

In some implementations, one or more advertisers 102*a* and/or 102*b* can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document 120. The advertisements may also include embedded information, such as a links, meta-information, and/or machine executable instructions, such as HTML or JavaScript™.

A user device, such as user device 108*a*, can submit a page content request 109 to a publisher or the search engine 112. In some implementations, the page content 111 can be provided to the user device 108*a* in response to the request 109. The page content can include advertisements provided by the advertisement management system 104, or can include executable instructions, e.g., JavaScript™, that can be executed at the user device 108*a* to request advertisements from the advertisement management system 104. Example user devices 108 include personal computers, mobile communication devices, television set-top boxes, etc.

Advertisements can also be provided for the publishers 106. For example, one or more publishers 106*a* and/or 106*b* can submit advertisement requests for one or more advertisements to the system 104. The system 104 responds by sending the advertisements to the requesting publisher 106*a* or 106*b* for placement on one or more of the publisher's web properties (e.g., websites and other network-distributed content). Alternatively, the system 104 responds by sending the advertisement directly to the user device 108*a* in response to a user device request for page content 111 from the one or more publishers 106*a* and/or 106*b*, typically via instructions embedded in the page content 111 received by the user device 108*a* from the publishers 106*a* and/or 106*b*.

The advertisements can include embedding links landing pages, e.g., pages on the advertisers 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 109 and advertisements can be sent to the user device 108 that requested the content (e.g., user device 108*a*) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106*a* and 106*b* can include general content servers that receive requests for content (e.g., articles, discussion threads, music, video, graphics, search results, web page listings, information feeds, etc.), and retrieves the requested content in response to the request. For example, content servers related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "dociDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§1.3. Advertisement Management

Advertisements and associated usage data can be stored as advertisement data in an advertisement data store 114. In some implementations, an advertiser 102 can further manage the serving of advertisement by specifying an advertising campaign. The advertising campaign can be stored in campaign data in a campaign data store 116 that can, for example, specify advertising budgets for advertisements, when, where and under what conditions particular advertisements may be served for presentation, etc. For example, a computer company may design an advertising campaign for a new laptop computer that is scheduled to be released in several weeks. The advertising campaign may have a budget of $500,000, and may have 30 different advertisements that are to be served for presentation during the month of November. Such data defining the advertisement campaign can be stored in the campaign data 116.

In some implementations, it is preferable that spending of an advertising campaign budget corresponds to progress towards a campaign goal. For example, if a campaign goal is to generate click-throughs for advertisements 120, a charge can be incurred for each click of an advertisement 120 for the campaign. The overall cost incurred for the campaign will thus roughly correspond to the goal of achieving click-throughs.

A campaign, however, may have different goals, the achievements of which are not readily accounted for by a per-action cost model. For example, a qualitative goal, such as increasing brand recognition or increasing brand likeability, may not readily correlate to the number of click-throughs, conversions, or impressions generated for an advertising campaign. A graph 132 of goal progress against time illustrates an example increase in the values of a qualitative campaign metric Q over the time during which a campaign is active. The metric Q can, for example, be a brand recognition metric. An initial campaign metric value B for the advertising campaign may be a current brand recognition percentage, e.g., the percentage of viewers that recognize the brand, and a campaign goal G can be a brand recognition percentage that is desired to be achieved by the campaign. As the campaign is run over time, progress toward the goal is shown by the curve that asymptotically approaches the goal G. This progress can be entirely independent of click-through rates, conversions, or other such cost metrics.

To allocate campaign charges in proportion to the campaign progress, a goal monitor 130 can be used in conjunction with the advertisement management system 140 to monitor the progress of a campaign toward the campaign goal G. To measure the campaign's progress toward the goal, the goal monitor can issue one or more advertisement surveys 134. Other methods for monitor goal progress can also be used. Example surveys can include computer instructions that generate an in situ survey. For example, an advertisement survey 134, upon execution by a user device 108, can generate an in situ survey substantially within the display region that would be normally occupied by the advertisement 120, i.e., the display region occupied by the survey version 122 of the advertisement 120. The survey can, for example, provide questions that relate to the qualitative campaign goal, e.g., a question to determine whether the user recognizes a brand the advertisement is advertising.

Although the graph 130 illustrates an asymptotic goal curve, other goal curves may occur, depending on the effectiveness of the campaign. For example, a campaign may benefit from a viral phenomena, and the goal curve may exponentially increase. Alternatively, a campaign may initially perform poorly, and the goal curve may initially be flat or even decrease.

§1.4 Goal Pricing

Figure 2:
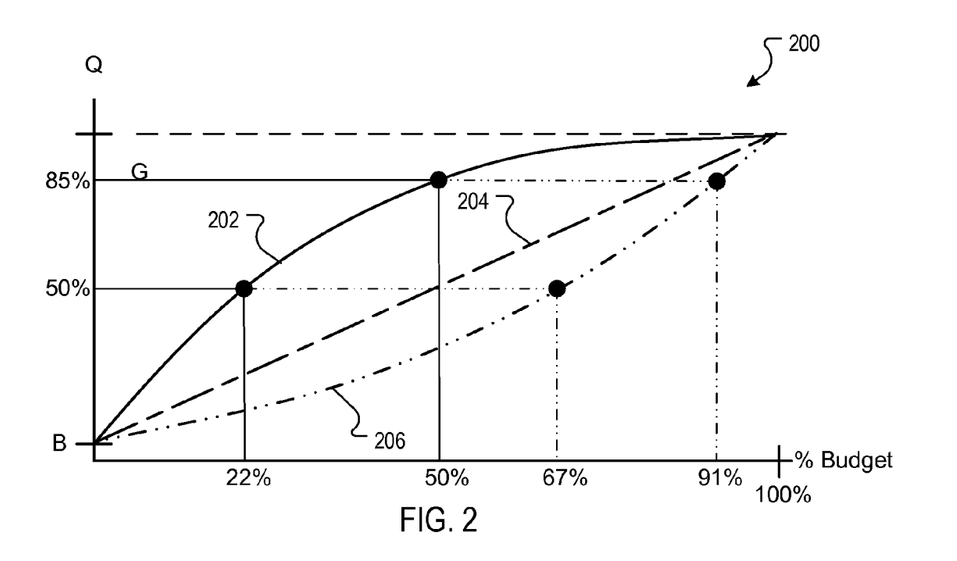
FIG. 2 is an example qualitative cost model graph.

In some implementations, the goal monitor 130 can implement a qualitative cost model that charges against a campaign budget in response to the progress made toward achieving a campaign goal G. FIG. 2 is an example qualitative cost model graph 200. The graph illustrates three example cost curves 200, 202 and 204; other cost curves, however, can also be used.

The cost curve 200 represents a cost model that allocates cost against a campaign budget in which the initial incremental costs are less expensive than the final incremental costs.

For example, at a time at which 50% of a campaign goal is achieved, only 22% of the campaign budget is spent; at a time at which 85% of a campaign goal is achieved, 50% of the campaign budget is spent; and the remaining 50% of the campaign budget can be allocated to the remaining 15% of the campaign goal.

The cost curve 202 represents a cost model that allocates cost against a campaign budget in which all incremental costs are equal. Thus, at a time at which 50% of a campaign goal is achieved, 50% of the campaign budget is spent, etc.

The cost curve 204 represents a cost model that that allocates cost against a campaign budget in which the initial incremental costs are more expensive that the final incremental costs. For example, at a time at which 50% of a campaign goal is achieved, approximately 67% of the campaign budget is spent; at a time at which 85% of a campaign goal is achieved, 91% of the campaign budget is spent; and the remaining 9% of the campaign budget can be allocated to the remaining 15% of the campaign goal.

Other types of cost models can also be used. For example, a cost model can be used in which a campaign cost is stepwise proportional to progress goal values of brand lift difference, such as charges against a campaign budget upon reaching certain lift percentages, e.g., 15%, 30%, 50%, etc. For each lift percentage goal value, a campaign cost can be attributed, and for each lift percentage goal value exceeded, the cumulative value of the attributed costs for the exceeded goal values will be charged to the advertiser (less any previous payments received from the advertiser for previously exceeded goal values).

In some implementations, the goal monitor 130 can serve advertisement surveys for a portion of the advertisements during subsequent time periods to track the goal progress of a campaign. After each survey period, the progress towards the campaign goal can be determined and the advertiser can be charged accordingly. Progress can be monitored on a periodic basis, e.g., daily or weekly. Alternatively, progress can be monitored at a frequency in proportion to the progress made, e.g., daily during the early stages of the campaign and weekly during the later stages of the campaign.

The qualitative cost model graph 200 does not necessarily indicate the amount of time a campaign has been in use. For example, spending at the rate defined by the cost curve 202 may result in the first 22% of the budget being spent during the first week of the campaign, the first 50% of the budget being spent during the first three weeks, and the remaining 50% of the budget being spent over the next six weeks following the first three weeks. Other spending distributions over time can result based on the campaign progress over time and the qualitative cost model used.

In some implementations, the goal monitor 130 can determine if a campaign is realizing a minimum goal progress during an interim time period. If the campaign fails to realize the minimum goal progress, the goal monitor 130 can suspend the campaign. Failure to achieve the minimum goal progress can be attributed to a variety or reasons, e.g., the campaign is performing poorly; the campaign has realized its maximum goal progress; etc. For example, if a campaign goal is to increase brand likeability and awareness through humorous video advertisements, much of the goal progress may be achieved during the first two months of the campaign; thereafter, much of the target market may have been reached, and the novelty of the advertisements is diminished, resulting in "advertisement blindness" in the target market. This can be detected by the goal monitor 130 when viewers either fail to engage the advertisements surveys, or if the survey data indicates a lack of progress towards a campaign goal during an interim period. Accordingly, it is of little benefit to the advertiser to keep running the campaign, and thus the goal monitor 130 can automatically suspend the campaign, regardless of the amount of the campaign budget that has been spent.

§2.0 Example Advertisements and Advertisements Surveys

Figure 3A:
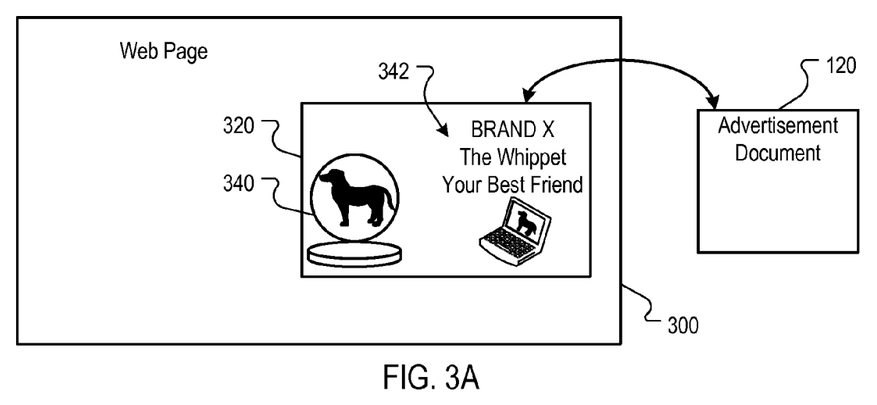
FIGS. 3A-3D are screen shots of example campaign advertisements and surveys for the advertisement that measure campaign metrics.

In some implementations, the advertisement surveys can be in situ surveys that are shown in the advertisements. FIGS. 3A-3D are screen shots of example campaign advertisements and surveys for the advertisement that measure campaign metrics. FIG. 3A depicts a displayed advertisement 320 being presented in one of potentially several contexts, e.g., either as an advertisement listed in response to a search query, or as an advertisement selected and displayed based on the content of an underlying web page, or based on some other context. The advertisement 320 can be displayed on a computer device, such as a user device 108, in response to execution of the instructions included in the advertisement document 120.

The advertisement 320 can, for example, be one of several or more advertisements for use in an advertising campaign for a new laptop computer. The advertisement 320 includes a logo 340, and a branding 342 that includes a Brand name, "Brand X," a product name, "Whippet," a slogan, "Your Best Friend," and an image of the product.

Figure 3B:
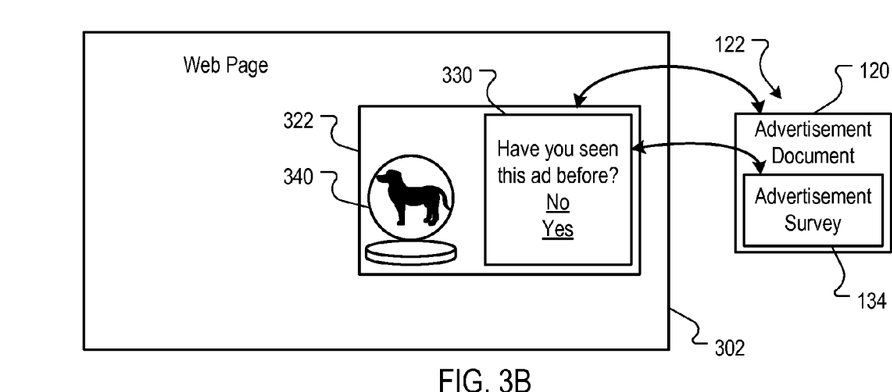

FIG. 3B is a screen shot 302 depicting a displayed survey version 322 of the advertisement 320. The survey version 320 can be displayed on a computer device, such as a user device 108, in response to execution of the instructions in the survey version 122 of the advertisement 120 and the advertisement survey 134 included in the survey version 122.

The in situ survey 330 of FIG. 3B presents questions related to advertisement recognition and likeability. A user selection of "No" indicates a lack of advertisement recognition; conversely, a selection of one or "Yes—Like it" or "Yes—Dislike it" indicates both advertisement recognition and a corresponding likeability factor. The survey 300 can be presented for a subset of the advertisements during the campaign, e.g., one survey can be served for every 1,000 impressions. The goal monitor 130 can collect survey results during survey periods to measure progress toward a qualitative campaign goal.

Figure 3C:
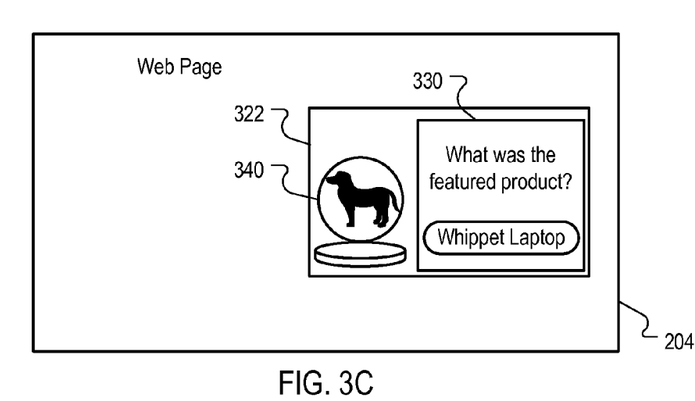

In some implementations, the survey 330 can be a single question. In other implementations, the survey 330 can include multiple hierarchical questions. FIG. 3C is a screen shot 304 depicting the survey version 322 of the advertisement 320 in which the survey 330 presents a second hierarchal question in response to a user selection of one of the "Yes—Like it" or "Yes—Dislike it" options presented in FIG. 3B. The question presented in the environment 332 is related to brand linkage, and includes a text field in which a user may enter a product description. Here, the user has entered "Whippet Laptop," which indicates that the user linked the brand to the logo 340.

Although only two questions are shown in FIGS. 3B and 3C, additional questions could also be presented during the survey. Additionally, while the survey shown in FIGS. 3B and 3C are in situ surveys, other survey types could also be used, e.g., selection of the survey 330 can redirect a web browser to a separate survey landing page or open a new browser window directed to the survey landing page.

Figure 3D:
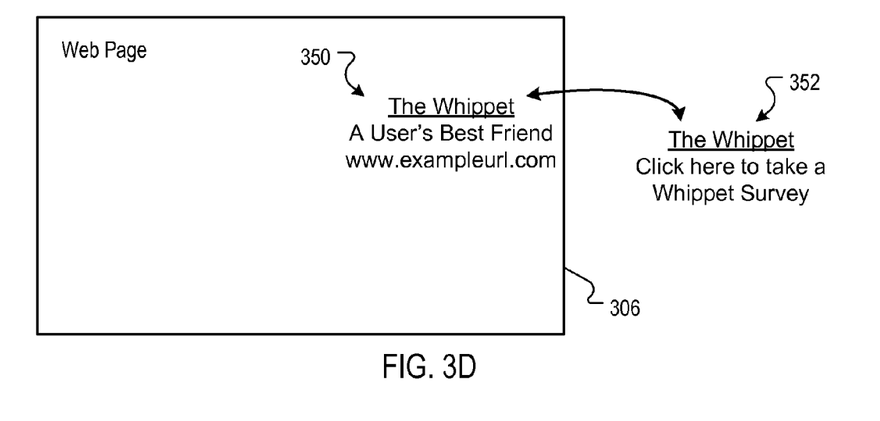

Other types of advertisements can also be presented with surveys. For example, FIG. 3D is a screen shot depicting an advertisement creative 350 that includes the brand name, a slogan, and a uniform resource location (URL) to a landing page. A survey version 352 of the advertisement 350 can be shown for a portion of the impression, e.g., once every 1,000 impressions, for example. The survey version 352 can include the same or similar survey features described with respect to FIGS. 3B and 3C above.

§3.0 Goal Measurement Based Auctioning

In some implementations, goal pricing of a campaign based on the initial campaign metric value and subsequent campaign metric values can be the sole pricing model for the campaign. In other implementations, the goal pricing can be integrated into an advertising auction to facilitate auctioning of advertisements for campaigns having qualitative goals with other advertisements.

Figure 4:
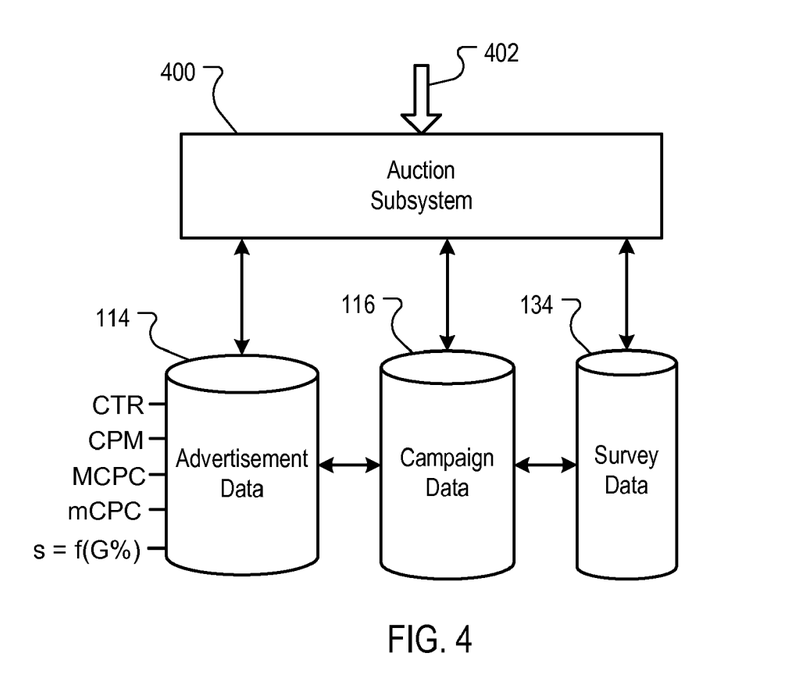
FIG. 4 is a block diagram of an example auction subsystem that includes campaign goal measurements in a bidding process.

FIG. 4 is a block diagram of an example auction subsystem that includes campaign goal measurements in a bidding process. The auction subsystem 400 can be included in the advertisement management system 104 of FIG. 1.

For advertisements that are subject to only a per-action cost model, e.g., subject to a budget that is based only on click-throughs and/or impressions, the auction process can be conducted according to a per-action cost model. For example, advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $1.00, and the maximum amount advertiser C will pay is $0.75.

In some implementations, the rank of an advertisement that is displayed can be determined by multiplying the maximum cost-per-click for the advertisement by a quality score of the advertisement. To calculate the quality score, the auction subsystem 400 can take into account a number of performance parameters of an advertisement 120 stored in the advertisement data store 114, such as the click through rate (CTR), a cost per number of actions (CPM), a maximum cost per click (MCPC), a minimum cost per click (mCPC), and other factors. Additional or fewer performance factors stored in the advertisement data store 114 can be by the auction subsystem. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0× $0.50=1.50

C: Rank=quality score×maximum cost-per-click=1.0× $1.00=1.00

B: Rank=quality score×maximum cost-per-click=1.0× $0.75=0.75

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisers A, B, and C can be determined as follows:

A: C's rank/A's quality score=1.0/3=$0.33+$0.01=$0.34

C: B's rank/C's quality score=0.75/1=$0.75+$0.01=$0.76

B: minimum cost-per-click=$0.20

In this example, advertiser A would only have to pay $0.34 to hold the first position in the list of advertisements. Advertiser C would have to pay $0.76 to hold the second position. Advertiser B would be required to pay the minimum cost-per-click amount of $0.20.

The campaign data 116 can also be used by the auction subsystem 400 when performing an auction. Advertiser budgets, placements, run rates, etc., can also be considered to ensure that an auction is conducted in a manner that is consistent with campaign strategies.

In some implementations, one or more of the performance parameters of advertisements associated with a goal-priced campaign can be adjusted based on the amount of progress the campaign has achieved. For example, when the goal campaign is initiated, the minimum cost per click of an advertisement in the goal-priced campaign can be an initial value M. However, as progress towards the goal increases, the initial value can be scaled by a scaling factor s that is based on one of the spend curves of FIG. 2, e.g., s can be a function of the percentage of goal achieved. For example, if the qualitative cost model uses the spend curve 200, then the value of s can increase as progress is made; conversely, if the qualitative cost model uses the spend curve 206, then the value of s can decrease as progress is made. Accordingly, the overall campaign progress toward a qualitative goal can be automatically integrated into the competitive bidding process.

Other types of scaling factors for advertisement bids and/or integrations of campaign goal progress can also be used. For example, a separate scaling factor for the minimum cost per click can be used; the click through rates of advertisements in campaigns that have a qualitative goal of increasing brand recognition can be ignored, as such ads may not be designed to elicit user actions, but instead are designed to increase brand recognition by the impression alone; etc.

§4.0 Example Advertisement Effectiveness Processes

Figure 5:
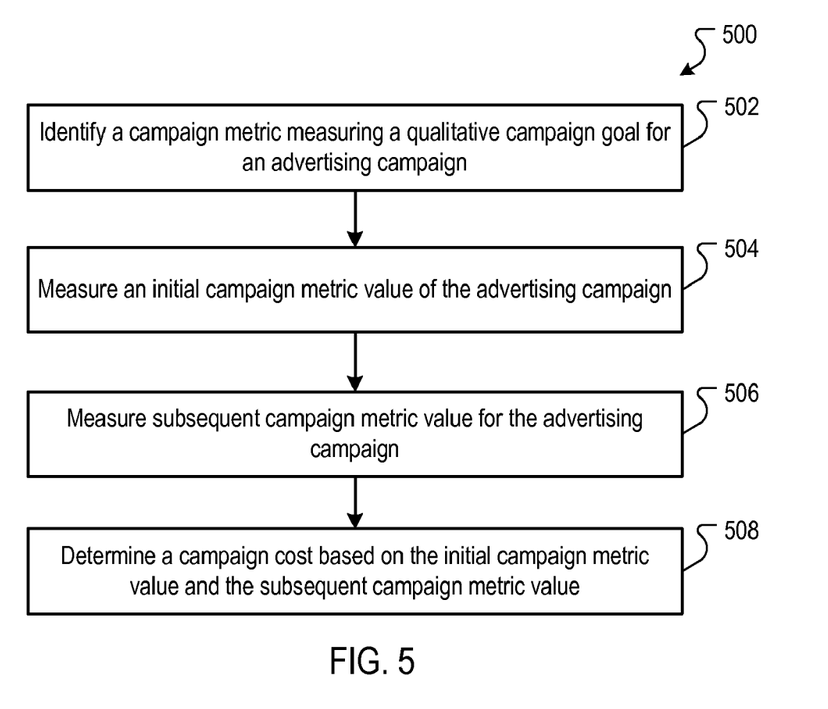
FIG. 5 is a flow diagram of an example process of campaign pricing based on a campaign goal metric.

FIG. 5 is a flow diagram of an example process 500 of campaign pricing based on a campaign goal metric. The example process 500 can be implemented in the goal monitor 130 of FIG. 1, or in other software implementations that can be used in conjunction with or implemented within the advertisement management system 104.

Stage 502 identifies a campaign metric measuring a qualitative campaign goal for an advertising campaign. For example, the goal monitor 130, or other software, can identify a campaign metric measuring a qualitative campaign goal for an advertising campaign, such as a brand linkage metric.

Stage 504 measures an initial campaign metric value of the advertising campaign. For example, the goal monitor 130, or other software, can measure brand linkage at the outset of a campaign by the use of advertisement surveys that are directed to brand linkage.

Stage 506 measures a subsequent campaign metric value for the advertising campaign. For example, the goal monitor 130, or other software, can measure subsequent brand linkage metrics during one or more subsequent time periods during the advertising campaign by use of the advertisement surveys. Stage 508 determines a campaign cost based on the initial campaign metric value and the subsequent campaign metric value. For example, the goal monitor 130, or other software, can determine a campaign cost that is applied against the budget of the campaign based on the progress made toward the qualitative campaign goal. The progress can, for example, be determined by the difference between the initial campaign metric value and the subsequent campaign metric values, e.g., a lift value. The cost can, for example, be applied to the campaign budget according to one of the example cost curves shown in FIG. 2, or can be applied by scaling one or more advertisement parameters for a bidding process.

Figure 6:
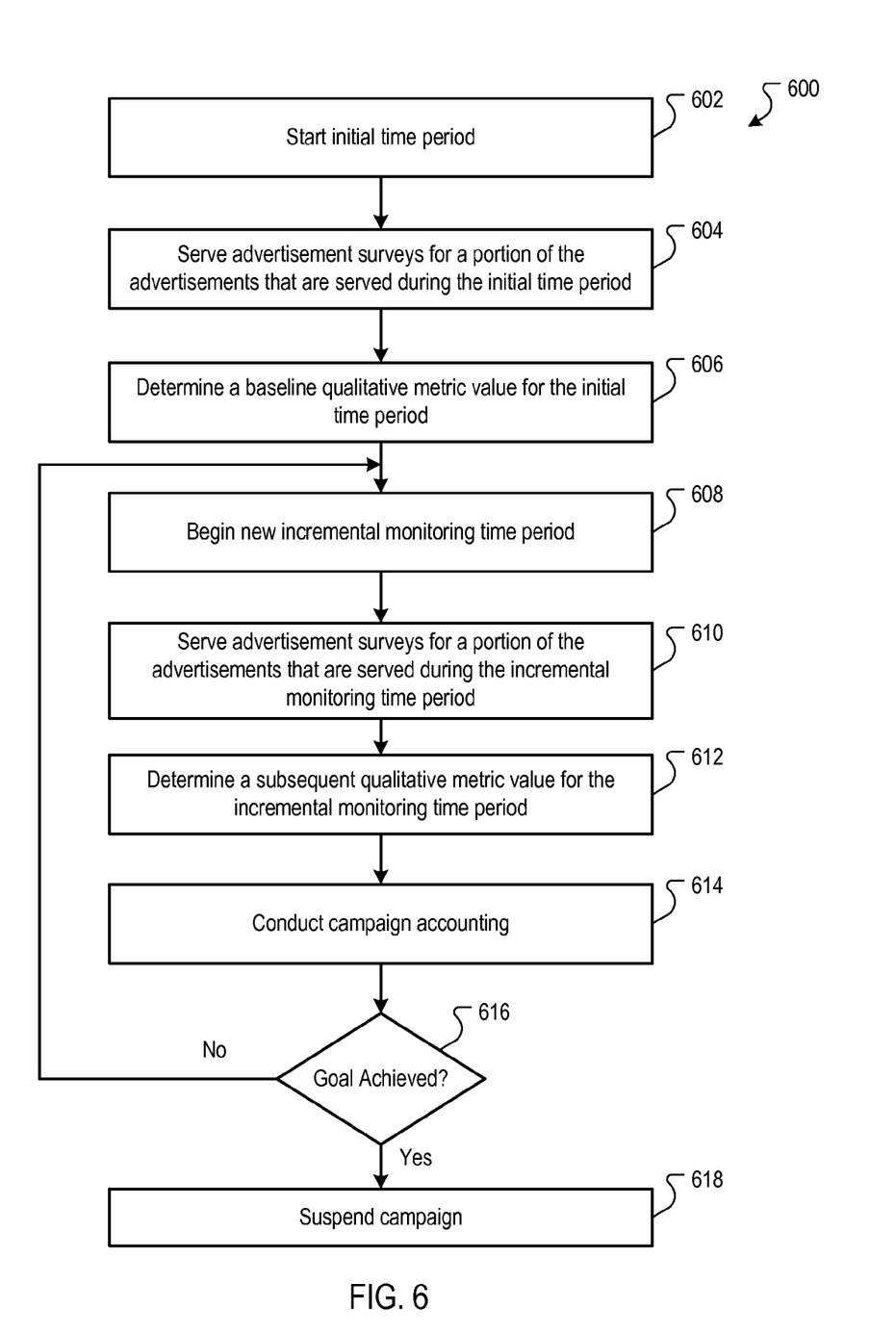
FIG. 6 is a flow diagram of another example process of campaign pricing based on a campaign goal metric.

FIG. 6 is a flow diagram of another example process 600 of campaign pricing based on a campaign goal metric. The example process 600 can be implemented in the goal monitor 130 of FIG. 1, or in other software implementations that can be used in conjunction with or implemented within the advertisement management system 104.

Stage 602 starts an initial time period. For example, the goal monitor 130, or other software, can start an initial time period when a campaign begins.

Stage 604 serves advertisement surveys for a portion of the advertisements that are served during the initial time period. For example, the goal monitor 130, or other software, can serve advertisement surveys for a portion of advertisements served during the initial time period.

Stage 606 determines a baseline qualitative metric value for the initial time period. For example, the goal monitor 130, or other software, can receive responses from the advertisement surveys served during the initial time period and determine a baseline qualitative metric value for the initial time period, e.g., an initial brand recognition level.

Stage 608 begins a new incremental monitoring time period. For example, the goal monitor 130, or other software, can start a new incremental time period after the initial period has expired or after a current incremental time period has expired. In some implementations, the new incremental time period can begin immediately after the initial period has expired or after a current incremental time period has expired. In other implementations, the new incremental time period can begin after an interim waiting period following the expiration of either the initial period or a current incremental time period.

Stage 610 serves advertisement surveys for a portion of the advertisements that are served during the incremental monitoring time period. For example, the goal monitor 130, or other software, can serve advertisement surveys for a portion of advertisements served during the new incremental time period.

Stage 612 determines a subsequent qualitative metric value for the incremental monitoring time period. For example, the goal monitor 130, or other software, can receive responses from the advertisement surveys served during the incremental time period and determine a subsequent qualitative metric value for the incremental monitoring time period, e.g., a subsequent brand recognition level.

Stage 614 conducts a campaign accounting. For example, the goal monitor 130, or other software, can determine a campaign cost that is applied against the budget of the campaign based on the progress made toward the qualitative campaign goal. The progress can, for example, be determined by the difference between any qualitative campaign metric value and a subsequent qualitative metric value. The cost can, for example, be applied to the campaign budget according to one of the example cost curves shown in FIG. 2, or can be applied by scaling one or more advertisement parameters for a bidding process.

Stage 616 determines if a qualitative campaign goal has been achieved. For example, the goal monitor 130, or other software, can determine if a goal in brand recognition lift has been achieved.

If stage 616 determines that a qualitative campaign goal has not been achieved, the process returns to stage 608 and stages 608-616 are repeated for a new incremental time period. Conversely, if stage 616 determines that a qualitative campaign goal has been achieve, then stage 618 suspends the campaign. For example, the goal monitor 130, or other software, can suspend a campaign if the qualitative goal of the campaign is determined to have been achieved.

Figure 7:
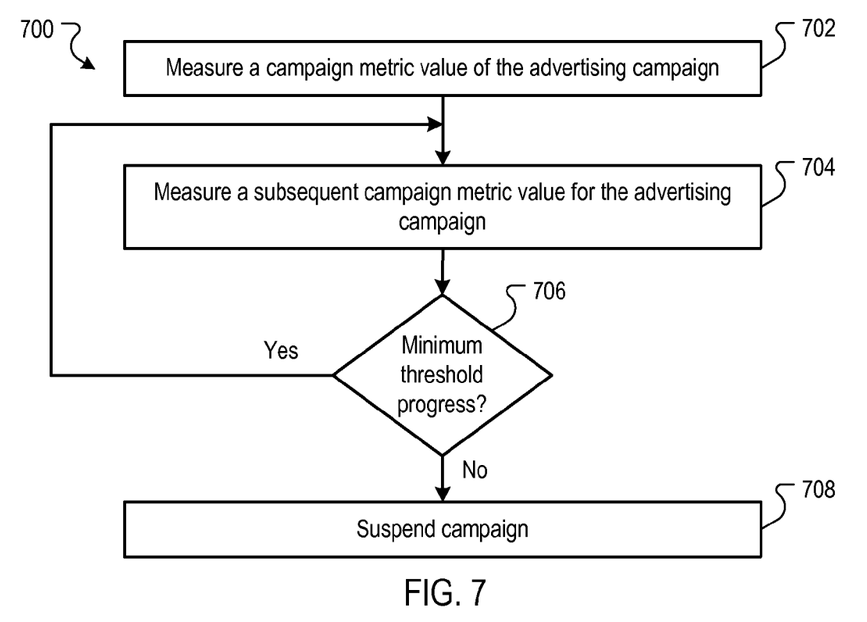
FIG. 7 is a flow diagram of an example process for automatically suspending a campaign.

FIG. 7 is a flow diagram of an example process 700 for automatically suspending a campaign. The example process 700 can be implemented in the goal monitor 130 of FIG. 1, or in other software implementations that can be used in conjunction with or implemented within the advertisement management system 104. The process 700 can be used to suspend a campaign independent of budget considerations if it is determined that the campaign is performing poorly, e.g., not progressing adequately toward achieving a qualitative campaign goal.

Stage 702 measures an initial campaign metric value of the advertising campaign. For example, the goal monitor 130, or other software, can measure an initial campaign metric value during an initial time period.

Stage 704 measures a subsequent campaign metric value for the advertising campaign. For example, the goal monitor 130, or other software, can measure a campaign metric value during a time period subsequent to the initial time period or during a time period subsequent to a time period that occurred during a previous execution of stage 704.

Stage 706 determines if a minimum threshold of progress is defined by the two metric values. For example, the goal monitor 130, or other software, can determine if the progress toward a qualitative campaign goal exceeds a minimum threshold progress value, e.g., greater than 1% lift. The determination can, for example, be based on a difference between the metric values. In some implementations, the minimum threshold progress can vary according to the time period, e.g., the minimum threshold progress may be larger during initial stages of the advertising campaign and may be reduced during later stages of the advertising campaign. In other implementations, the minimum threshold progress can be static, e.g., 1%.

If stage 706 determines that a minimum threshold of progress is defined by the two subsequent metric values, then the process returns to stage 704, and a new subsequent campaign metric value is measured. Stage 706 is then repeated for the two subsequent metric values. Conversely, if stage 706 determines that a minimum threshold of progress is not defined by the two subsequent metric values, then stage 708 suspends the campaign. For example, the goal monitor 130, or other software, can suspend the campaign if the progress defined by the two subsequent metric values does not exceed the minimum threshold of progress.

Figure 8:
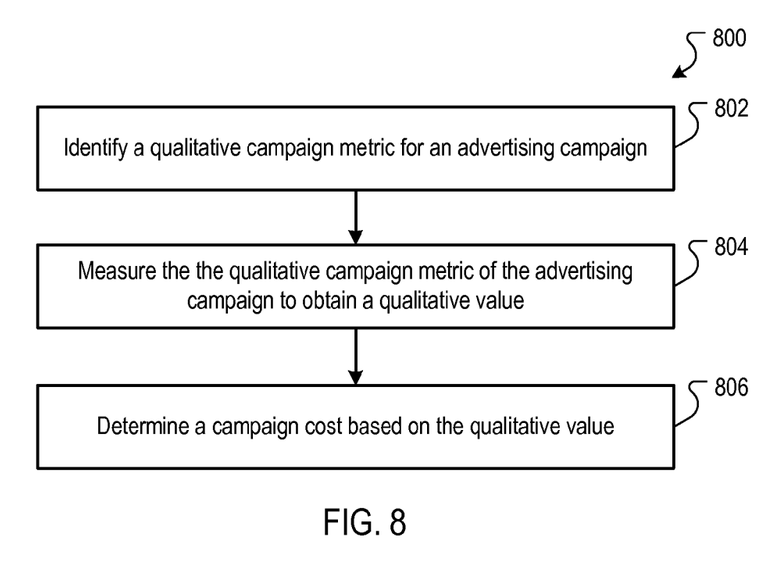
FIG. 8 is a flow diagram of an example process of campaign pricing based on a qualitative campaign metric.

FIG. 8 is a flow diagram of an example process of campaign pricing based on a qualitative campaign metric. The example process 800 can be implemented in the goal monitor 130 of FIG. 1, or in other software implementations that can be used in conjunction with or implemented within the advertisement management system 104.

Stage 802 identifies a qualitative campaign metric for an advertising campaign. For example, the goal monitor 130, or other software, can identify a qualitative campaign metric for measuring a qualitative metric of the advertising campaign.

Stage 804 measures the qualitative campaign metric of the advertising campaign to obtain a qualitative value. For example, the goal monitor 130, or other software, can measure the qualitative campaign metric by use of a survey to obtain a qualitative value, e.g., a brand likeability or brand approval measure.

Stage 806 determines a campaign cost based on the qualitative value. For example, the goal monitor 130, or other software, can determine a campaign cost based on the qualitative value. For example, in some implementations, goal monitor 130 can identify progress goal values and attribute a campaign charge for each progress goal value. The goal monitor 130 can compare the qualitative value to the progress goal values and determine a campaign cost based on the campaign charges attributed to the progress goal values that are exceeded by the qualitative value.

§5.0 Example Processing System

Figure 9:
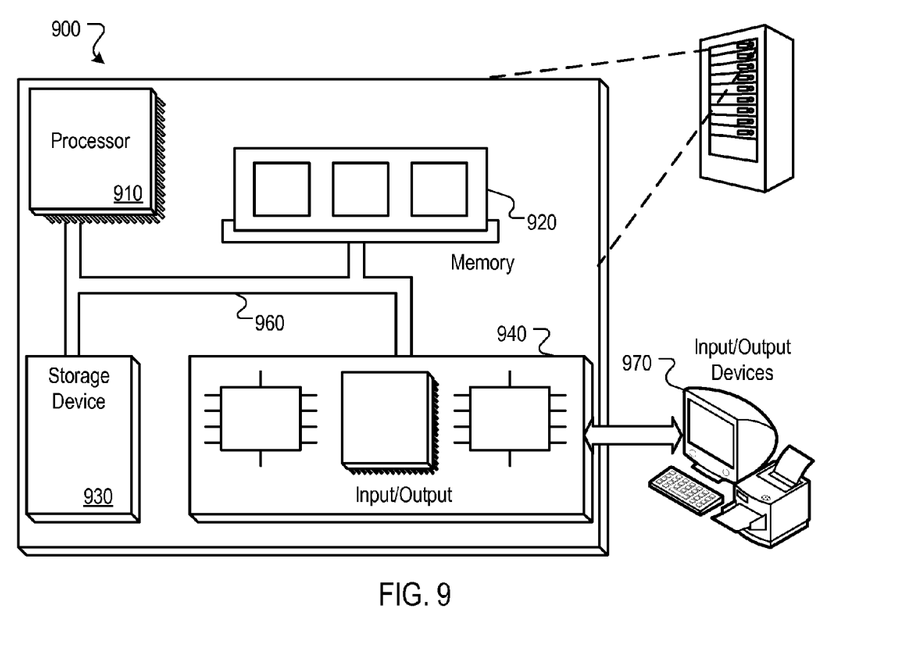
FIG. 9 is block diagram of an example computer system that can be used to facilitate management of an advertising campaign.

FIG. 9 is block diagram of an example computer processing system 900 that can be used to facilitate campaign goal pricing. The system 900 includes a processor 910, a memory 920, a storage device 930, and an input/output device 940. Each of the components 910, 920, 930, and 940 can, for example, be interconnected using a system bus 960. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 970. Other implementations, however, can also be used, such as mobile computing devices, mobile communication devices, set-top box television client devices, etc.

The goal monitor 130 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The goal monitor 130 can be distributively implemented over a network, such as a server farm, or can be implemented in a single computer device.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying a campaign metric for an advertising campaign, the campaign metric for measuring progress toward a qualitative campaign goal for the advertising campaign, the qualitative campaign goal being specified by a value of the campaign metric, the qualitative campaign goal being a campaign goal that progress toward is determined independent of per-action cost metrics;
   determining, by a computer, a cost model allocating cost against a budget of the campaign based on the progress made toward the qualitative campaign goal, the determining including:
      measuring an initial campaign metric value of the advertising campaign based on survey results received from advertisement surveys served for a portion of advertisements during an initial time period;
      specifying an allocation of the cost against the budget for a plurality of values of the campaign metric, the plurality of values including the initial campaign metric value, a goal metric value, and a plurality of values having a magnitude between the initial campaign metric value and the goal metric value, wherein each value is independent of per-action cost metrics;
   measuring subsequent campaign metric values for the advertising campaign based on survey results received from advertisement surveys served for a portion of advertisements during a subsequent time period that is after the initial time period;
   for each subsequent campaign metric value:
      determining a value indicative of progress made toward the campaign goal based on the subsequent campaign metric value and one of the initial campaign metric value or a prior subsequent campaign metric value;
      determining, by the computer, a campaign cost that is proportional to the value indicative of the progress made toward the campaign and the allocation of cost against the budget based on the progress specified by the cost model; and
      charging the campaign cost against the budget.

2. The method of claim 1, wherein the campaign metric value is related to brand awareness lift.

3. The method of claim 2, wherein measuring an initial campaign metric value of the advertising campaign comprises:
   serving advertisements associated with the advertising campaign;
   serving the advertisement surveys for the portion of the advertisements that are served during the initial time period;
   receiving results in response to user participation in the advertisement surveys; and
   determining a baseline brand awareness lift value for the initial time period.

4. The method of claim 3, wherein measuring subsequent campaign metric values for the advertising campaign comprises:
   serving advertisements associated with the advertising campaign;
   serving the advertisement surveys for portion of the advertisements that are served during the subsequent time period that is after the initial time period;
   receiving results in response to user participation in the advertisement surveys; and
   determining a subsequent brand awareness lift value for the subsequent time period.

5. The method of claim 4, wherein determining a value indicative of progress made toward the campaign goal based on the subsequent campaign metric value and one of the initial campaign metric value or a prior subsequent campaign metric value comprises:
   determining a brand lift difference of the subsequent brand awareness lift value and the initial brand awareness value or the prior subsequent brand awareness lift value; and
   wherein determining a campaign cost that is proportional to the value indicative of the progress made toward the campaign further comprises:
   determining a campaign cost that is proportional to the brand lift difference and the allocation of the cost against the budget.

6. The method of claim 5, wherein determining a campaign cost that is proportional to the brand lift difference comprises determining a campaign cost that is linearly proportional to brand lift difference.

7. The method of claim 5, wherein determining a campaign cost that is proportional to the brand lift difference comprises determining a campaign cost that is stepwise proportional to brand lift difference.

8. The method of claim 1, wherein determining a campaign cost that is proportional the value indicative of the progress made toward the campaign comprises:

determining a bid scaling value that is proportional to the value indicative of progress made toward the campaign goal; and scaling advertisement bids associated with the campaign by the bid scaling value.

9. The method of claim 5, wherein the advertisement surveys comprise surveys that determine whether a survey participant recognizes a brand of a product or service that is advertised.

10. The method of claim 5, further comprising:
determining if the brand lift difference exceeds a qualitative goal value; and
if the brand lift differences exceeds the qualitative goal value, then discontinuing the advertising campaign.

11. The method of claim 1, wherein the campaign metric value is related to target demographic penetration.

12. The method of claim 1, wherein the campaign metric value is related to advertisement recall.

13. The method of claim 1, further comprising:
determining if a campaign progress threshold is exceeded based on the value indicative of progress made toward the campaign goal; and
suspending the campaign if the campaign progress threshold is not exceeded.

14. A non-transitory computer readable medium storing software, the software comprising instructions executable by a processing system and upon such execution cause the processing system to perform operations comprising:
identifying a campaign metric for an advertising campaign, the campaign metric for measuring progress toward a qualitative campaign goal for the advertising campaign, the qualitative campaign goal being specified by a value of the campaign metric, the qualitative campaign goal being a campaign goal that progress toward is determined independent of per-action cost metrics;
determining a cost model allocating cost against a budget of the campaign based on the progress made toward the qualitative campaign goal, the determining including:
measuring an initial campaign metric value of the advertising campaign based on survey results received from advertisement surveys served for a portion of advertisements during an initial time period; and
specifying an allocation of the cost against the budget for a plurality of values of the campaign metric, the plurality of values including the initial campaign metric value, a goal metric value, and a plurality of values having a magnitude between the initial campaign metric value and the goal metric value, wherein each value is independent of per-action cost metrics;
measuring subsequent campaign metric values for the advertising campaign based on survey results received from advertisement surveys served for a portion of advertisements during an subsequent time period that is after the initial time period; and
for each measured subsequent campaign metric value:
determining a value indicative of progress made toward the campaign goal based on the subsequent campaign metric value and one of the initial campaign metric value or a prior subsequent campaign metric value;
determining a campaign cost that is proportional to the value indicative of the progress made toward the campaign and the allocation of cost against the budget based on the progress specified by the cost model; and
charging the campaign cost against the budget.

15. The computer readable medium of claim 14, wherein the campaign metric value is related to brand awareness lift.

16. The computer readable medium of claim 15, wherein the instructions cause the processing system to perform operations comprising:
determining a baseline brand awareness lift value for the initial time period;
determining a subsequent brand awareness lift value for a subsequent time period;
determining a brand lift difference of the subsequent brand awareness lift value and the initial brand awareness lift value or the prior subsequent brand awareness lift value; and
determining a campaign cost that is proportional to the brand lift difference and the allocation of the cost against the budget.

17. The computer readable medium of claim 16, wherein the operation of determining a campaign cost that is proportional to the brand lift difference comprises the operation of determining a campaign cost that is linearly proportional to brand lift difference.

18. The computer readable medium of claim 14, wherein the campaign metric value is target demographic penetration.

19. A system, comprising:
a campaign data store storing data defining an advertising campaign and advertisements associated with the campaign;
a data processing apparatus in data communication with the campaign data store; and
a memory in data communication with the data processing apparatus and storing instructions executable by the data processing apparatus and that upon such execution cause the data processing apparatus to perform operations comprising:
determining a cost model allocating cost against a budget of the campaign based on the progress made toward a qualitative campaign goal, the qualitative campaign goal being a campaign goal that progress toward is determined independent of per-action cost metrics, the determining including:
measuring an initial campaign metric value of the advertising campaign based on survey results received from advertisement surveys served for a portion of advertisements during an initial time period and measuring a subsequent campaign metric value for the advertising campaign based on survey results received from advertisement surveys served for a portion of advertisements during an subsequent time period after the initial time period; and
specifying an allocation of the cost against the budget for a plurality of values of the campaign metric, the plurality of values including the initial campaign metric value, a goal metric value, and a plurality of values having a magnitude between the initial campaign metric value and the goal metric value, wherein each value is independent of per-action cost metrics;
determining a value indicative of progress made toward the campaign goal based on the subsequent campaign metric value and one of the initial campaign metric value or a prior subsequent campaign metric value; and
determining a campaign cost that is proportional to the value indicative of the progress made toward the campaign and the allocation of cost against the budget based on the progress specified by the cost model.

* * * * *

UNITED STATES PATENT AND TRADEMARK OFFICE
CERTIFICATE OF CORRECTION

| | | |
|---|---|---|
| PATENT NO. | : 8,386,398 B1 | Page 1 of 1 |
| APPLICATION NO. | : 12/124453 | |
| DATED | : February 26, 2013 | |
| INVENTOR(S) | : Hickman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this
Sixteenth Day of December, 2014

Michelle K. Lee
*Deputy Director of the United States Patent and Trademark Office*